Patented July 29, 1952

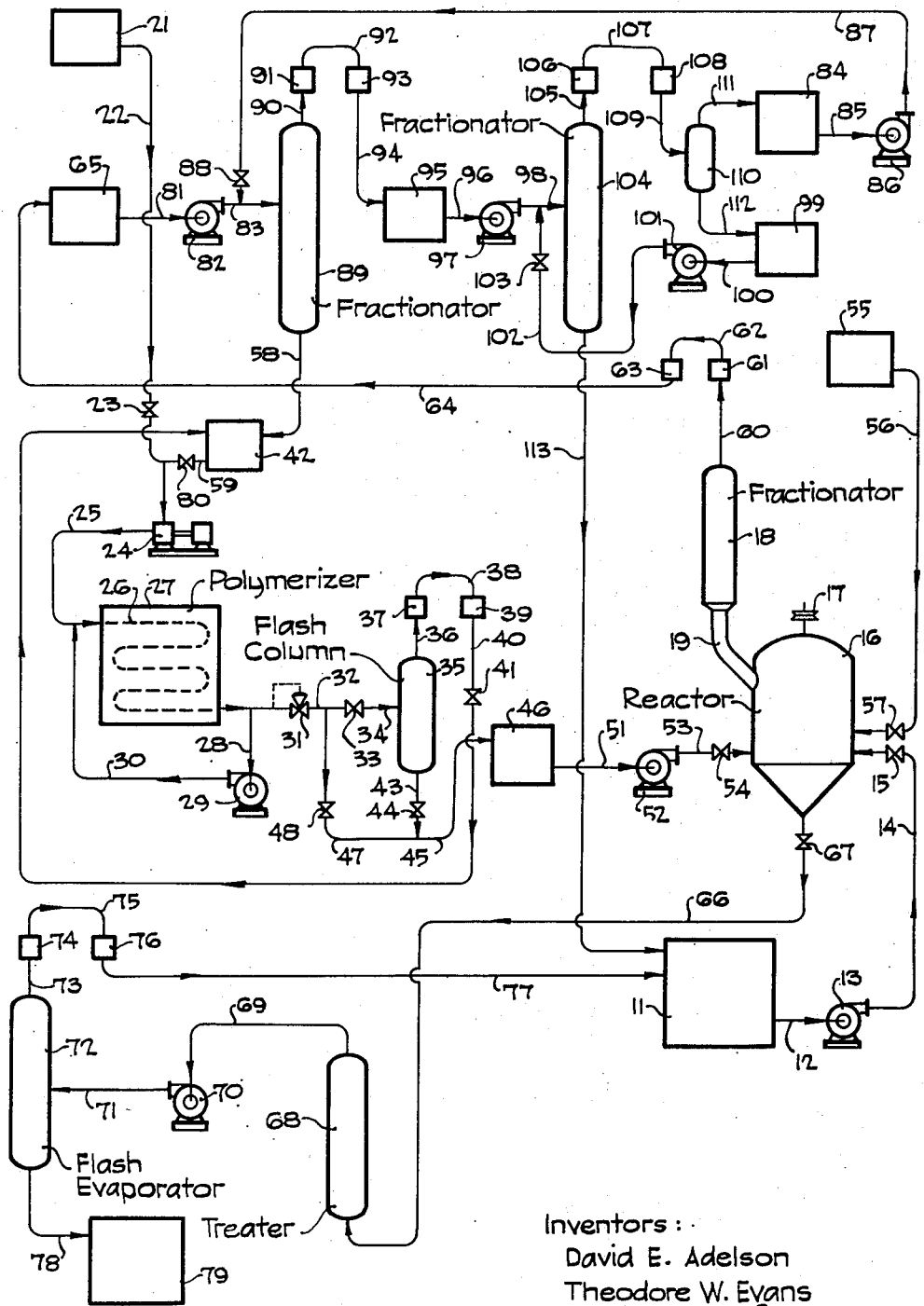

2,605,216

UNITED STATES PATENT OFFICE 2,605,216

PROCESS FOR SEPARATING THE AZEOTROPIC MIXTURE OF ALLYL ALCOHOL AND ALLYL ACETATE

David E. Adelson, Berkeley, and Theodore W. Evans, Oakland, Calif., assignors to Shell Development Company, San Francisco, Calif., a corporation of Delaware Original application April 15, 1944, Serial No. 531,254. Divided and this application December 2, 1949, Serial No. 130,826

7 Claims. (Cl. 202—42)

This invention relates to a process for separating the components of the azeotropic mixture obtained by distilling a beta, gamma-olefinic alcohol in admixture with a saturated monocarboxylic acid ester of the alcohol. The invention is further concerned with a process for producing polyallyl alcohol wherein polyallyl acetate is reacted with allyl alcohol while distilling the formed allyl acetate from the reaction mixture as the azeotropic mixture with allyl alcohol, and relates to an improvement in separating the components of the azeotropic mixture.

In this application, the term "beta,gamma-olefinic alcohol" is used to designate a class of unsaturated alcohols having an olefinic, double bonded linkage between the two carbon atoms which are in the beta and gamma positions with respect to the saturated carbon atom to which the hydroxyl group of the alcohol is directly attached. In other words, the class of unsaturated alcohols with which the invention is concerned has an olefinic linkage between two carbon atoms one of which is directly linked to a saturated carbon atom having the hydroxyl group linked directly thereto. The lowest member of the beta,gamma-olefinic alcohols is allyl alcohol. Illustrations of other members of the class will be given hereinafter.

This application is a division of our copending application, Serial No. 531,254, filed April 15, 1944, which was a continuation-in-part of our application now matured as Patent No. 2,473,124. As described in the patent, polymer of a beta,gamma-olefinic alcohol is produced by polymerizing a saturated monocarboxylic acid ester of the alcohol, subjecting the polymeric ester to ester-exchange or alcoholysis with monomer of the unsaturated alcohol while distilling the formed monomeric ester from the reaction mixture substantially as fast as formed at normal, subatmospheric, or superatmospheric pressure, and thereby obtaining the desired polymeric alcohol. The monomeric ester formed in the alcoholysis reaction may be polymerized to supply polymeric ester for this reaction. However, upon distilling the formed ester from the reaction mixture during the reaction, the ester is obtained as an azeotropic mixture with monomer of the beta,gamma-olefinic alcohol present as reactant therein. It is highly desirable that the monomeric ester be free of monomeric alcohol when subjected to polymerization. The present invention provides a method for separating the alcohol and ester of the azeotropic mixture so as to obtain substantially pure ester for the above-mentioned polymerization operation.

According to the invention, the alcohol-ester azeotrope is separated by distilling it in admixture with a suitable third agent which forms a binary azeotrope with the alcohol therein. In the distillation, the binary azeotrope of alcohol and third agent is obtained as distillate and ester, substantially free of alcohol, is secured as residue. The alcohol in the distillate is then recovered by again distilling the distillate in admixture with water whereby substantially pure alcohol is obtained as bottom product and a ternary azeotrope of alcohol, water and the third agent, is collected as distillate. The third agent has properties such that this distillate separates or stratifies into two liquid phases or layers upon being cooled to normal temperatures. The more aqueous layer is recycled to supply the water needed in the second distillation step while the other layer is returned to supply the third agent needed in the first distillation step. The method is applicable to separating the components of the azeotropic mixture obtained by distilling a beta,gamma-olefinic alcohol containing not more than 6 carbon atoms in admixture with a saturated monocarboxylic acid ester of the alcohol containing not more than 12 carbon atoms, which azeotrope may be obtained during production of polymer of the unsaturated alcohol as described hereinbefore.

The beta,gamma-olefinic alcohols which are separated from the azeotropic mixture with their corresponding saturated monocarboxylic acid esters may be either primary, secondary or tertiary alcohols. Primary alcohols are preferred as are also beta,gamma-olefinic alcohols having the carbon atom of a terminal methylene group attached by an olefinic double bond to a carbon atom which is directly attached to a saturated carbon atom having the hydroxyl group linked directly thereto. Representative specific examples of the most preferred subclass of alcohols include such compounds as allyl alcohol, methallyl alcohol, ethallyl alcohol, buten-1-ol-3, penten-1-ol-3, hexen-1-ol-3, 3-methylbuten-1-ol-3, 3-methylpenten-1-ol-3, 2-methylbuten-1-ol-3, 2-methylpenten-1-ol-3, 2,3-dimethylbuten-1-ol-3, 4-chlorobuten-1-ol-3, etc. Other less preferred compounds include crotyl alcohol, tiglyl alcohol, angelyl alcohol, penten-2-ol-1, hexen-2-ol-1, 4-methylpenten-2-ol-1, penten-3-ol-2, 4-methylpenten-3-ol-2, cyclopenten-2-ol-1, cyclohexen-2-ol-1, etc. The corresponding saturated monocarboxylic acid esters of the alcohols in azeotropic mixture with the alcohols, which esters contain not more than 12 carbon atoms, include such representative esters as beta,gamma-olefinic alcohol formates, acetates, propionates, butyrates, isobutyrates, valerates, chloracetates, dichloracetates, trichloracetates, bromacetates, methoxyacetates, caproates, caprylates, cyclopentane monocarboxylates, hexahydrobenzoates, etc.

The accompanying drawing is a flow diagram illustrating execution of the process of the invention with particular reference to the embodiment wherein the azeotrope of allyl acetate and allyl alcohol obtained during production of polyallyl alcohol is separated into its components.

In the drawing, monomeric allyl alcohol contained in storage vessel 11 is conveyed through pipe 12 to pump 13. The allyl alcohol is discharged from pump 13 through line 14 containing valve 15 to ester-exchange unit or reactor 16. Ester-exchange unit 16 consists of a vessel fitted with a stirrer 17 and a fractioning column 18 connected therewith by conduit 19. The polyallyl acetate, which is reacted with the allyl alcohol in ester-exchange unit 16, is produced in the following manner. Monomeric allyl acetate needed to start the system is contained in storage vessel 21 from which it is passed by pipe 22 with valve 23 therein to pressure pump 24 which supplies the pressure needed to maintain the allyl acetate liquid during the polymerization. The allyl acetate is admixed with about 2% nickel acetate as polymerization catalyst. Pressure pump 24 discharges through line 25 to lengthy nickel coil 26 contained in polymerization unit 27. The allyl acetate in nickel coil 26 is heated with hot oil to about 225° C. for a time of from about 2 to 3 hours, circulation through polymerization unit 27 being effected from coil 26 to line 28 hence by means of circulating pump 29 to line 30 and returned to coil 26. Polymerization unit 27 can be operated continuously, if desired, by continuously pumping allyl acetate into coil 26 so that the residence time therein is about 2 to 3 hours. The pressure supplied by pump 24 is sufficient to maintain the contents liquid, the pressure being regulated with pressure regulator valve 31 in line 32 which is connected to valve 33 and by line 34 to flash column 35. The product from the polymerization step is a mixture of monomeric allyl acetate and polyallyl acetate. By passing this mixture to flash column 35, the bulk of the monomeric allyl acetate is removed from the product. Flash column 35 is fitted with line 36 to partial condenser 37 from which vapors of allyl acetate pass through pipe 38 to condenser and valve 39. The liquid allyl acetate is passed through line 40 fitted with valve 41 to intermediate storage vessel 42. The residue from flash column 35, consisting primarily of polyallyl acetate, is discharged through line 43 containing valve 44 connected to line 45 and into intermediate storage vessel 46. Alternatively, the crude polymer from the polymerization step can be passed directly to storage vessel 46 to await the ester-exchange reaction without removal of the bulk of monomer therefrom by means of by-pass line 47 fitted with valve 48. Valve 48 is opened after closing valves 33, 44 and 41 which cuts out flash column 35.

The polyallyl acetate, which is converted to polyallyl alcohol by reaction with monomeric allyl alcohol in ester-exchange unit 16, is withdrawn from storage vessel 46 through line 51 by means of pump 52 which discharges through pipe 53 containing valve 54 into ester-exchange unit 16. The ester-exchange unit is shown to operate batchwise. A quantity of the polyallyl acetate is charged to the unit along with sufficient allyl alcohol to make about 5 to 15 times the amount theoretically needed to effect the conversion of the polyallyl acetate to polyallyl alcohol. Ester-exchange catalyst consisting of sodium alloxide dissolved in sufficient allyl alcohol so as to be fluid is charged from vessel 55 by pipe 56 containing valve 57 into ester-exchange unit 16. Sufficient catalyst is used so that there is about 1% of sodium based on the total weight of the reaction mixture.

The contents of ester-exchange unit 16 are stirred and heated to boiling whereupon the allyl acetate vaporizes from the vessel into fractionating column 18. Vapors from the column pass by line 60 to partial condenser 61 which provides the reflux necessary for operation of column 18. Uncondensed distillate is conveyed by line 62 to condenser and cooler 63 from which liquid distillate is passed to intermediate storage vessel 65 by pipe 64. The distillate is an azeotropic mixture of allyl alcohol and allyl acetate which contains about 37% of the latter and boils at about 95.1° C. under normal pressure. The monomeric allyl acetate formed by the ester-exchange reaction is distilled from the reaction mixture substantially as fast as formed. The reaction is preferably continued until conversion of the polyallyl acetate to polyallyl alcohol is complete. Upon completion of the reaction, the contents of reaction vessel 16, consisting of the polyallyl alcohol dissolved in the excess of allyl alcohol remaining therewith and contaminated by the sodium alloxide catalyst, are discharged through line 66 by opening valve 67. The solution is conducted into and through container 68 which is packed with a cation-exchange resin known to the trade as Amberlite IR–1 which removes the catalyst from the solution. The purified solution is then passed by line 69 to pump 70 which discharges through pipe 71 into evaporating column 72. The excess monomeric allyl alcohol is distilled from the polyallyl alcohol in column 72 from which vapors of allyl alcohol are conducted by line 73 to partial condenser 74 and uncondensed vapors of the distillate pass by line 75 to condenser and cooler 76. The distillate which is allyl alcohol is conveyed by line 77 to storage vessel 11 for reuse in the process. The purified polyallyl alcohol is discharged from column 72 through pipe 78 to storage vessel 79.

Separation of the azeotropic mixture obtained as distillate from the ester-exchange operation is effected by the process of the invention using the azeotropic method with an added third agent. The azeotropic mixture of allyl alcohol and allyl acetate is collected from the ester-exchange operation in vessel 65. The azeotropic mixture is conducted by line 81 to pump 82 which discharges into pipe 83. From vessel 84, benzene or, after the system is in operation, benzene mixed with a minor proportion of allyl alcohol, is conveyed by pipe 85 to pump 86 which discharges into line 87 containing control valve 88 which is used to regulate the amount of benzene fed into fractionating column 89 with the azeotropic mixture of allyl alcohol and allyl acetate. In fractionating column 89 which is an efficient column of about 15 theoretical plates, an azeotrope of benzene and allyl alcohol forms and is conveyed by pipe 90 to partial condenser 91 which supplies the reflux needed for the fractionation. The distillate vapors are conducted from partial condenser 91 through line 92 to condenser and cooler 93 from which the distillate is conveyed by pipe 94 to intermediate storage vessel 95. The residue from the fractionation in column 89 consists of pure or substantially pure allyl acetate which is conveyed by pipe 58 to vessel 42 for recycle in the process, i. e. it passes after opening valve 80 in line 59 to the polymerization operation. The distillate from operation of column 89, which is collected in vessel 95, is an azeotropic mixture of benzene and allyl alcohol containing about 17.3% allyl alcohol and has a normal boiling point of about 76.8° C.

The benzene-allyl alcohol azeotropic mixture is passed by line 96 to pump 97 which discharges into line 98. Water at the start of the operation, or a mixture of water containing a minor portion of allyl alcohol after the system is in operation, is contained in vessel 99 from which it is conveyed by line 100 to pump 101 discharging into line 102 having therein valve 103 which is used to regulate the amount of water admitted so that anhydrous and pure or substantially pure allyl alcohol is obtained from fractionating column 104. The vaporous distillate from column 104 passes through pipe 105 to partial condenser 106 which provides reflux needed for operation of the column. The uncondensed vapors are conveyed from partial condenser 106 by pipe 107 to condenser and cooler 108 from which the condensate is conveyed by pipe 109 to separator 110. The distillate from the column is a mixture consisting of approximately 9.1% allyl alcohol, 7.1% water and 83.8% benzene. This mixture stratifies or separates into two layers at about 20° C. in separator 110. The upper layer, which is 92% of the total, contains 91.1% benzene, 8.4% allyl alcohol and about 0.5% water and is conveyed by pipe 111 into intermediate storage vessel 84 for recycling in the system. The lower layer which is 8% of the total contains 82.3% water, 17.5% allyl alcohol and about 0.2% benzene and is conveyed by pipe 112 to intermediate storage vessel 99 for recycle in the system. The bottom product or residue from column 104 is pure or substantially pure allyl alcohol which is conveyed by pipe 113 to storage vessel 11.

The foregoing description illustrates one variation of the invention in which allyl alcohol from vessel 11 is processed by the method so as to obtain the final product, polyallyl alcohol, in vessel 79. While the drawing shows the most essential equipment needed in the operation of the process, various other equipment like valves, pumps, preheaters, heat exchangers, reboilers, heating coils, condensing coils, and the like, are not shown since these will be obvious to one skilled in the art and, if shown, would unduly complicate the drawing.

The drawing illustrates the process with reference to production of polyallyl alcohol by means of allyl acetate and the variation in which benzene and water are used to afford separation of the alcohol-acetate azeotrope. In place of benzene for effecting separation of the alcohol-ester azeotrope, other materials which can be used include toluene, xylene, ethylbenzene, hexane, heptane, octane, nonane, cyclohexane, methylcyclohexane, isopropylcyclohexane, trichloroethylene, dichloromethane, diallyl ether, dimethallyl ether, dicrotyl ether, and the like. In general, the material is one which boils within 50° C. of the monomeric beta,gamma-olefinic alcohol separated, forms a binary azeotrope with that alcohol and forms a ternary azeotrope with water and the alcohol, which latter azeotrope separates into two phases at ordinary room temperature of about 20° C. Preferably, the substance is an aromatic hydrocarbon of the required boiling point.

We claim as our invention:

1. A process for separating the azeotropic mixture obtained by distilling monomer of a beta,gamma-olefinic alcohol in admixture with monomer of a saturated monocarboxylic acid ester of the beta,gamma-olefinic alcohol, said monomeric alcohol containing not more than 6 carbon atoms and said monomeric ester containing not more than 12 carbon atoms, which comprises first fractionally distilling the azeotropic mixture in admixture with an agent selected from the group consisting of an aromatic hydrocarbon which has a normal boiling point within 50° C. of the normal boiling point of said monomeric alcohol and which forms a binary azetrope with the alcohol as well as a ternary azeotrope with the alcohol and water, which ternary azeotrope stratifies into two liquid phases at 20° C., hexane, heptane, cyclohexane, methylcyclohexane, trichloroethylene and allyl ether; collecting as residue from said first distillation monomeric ester substantially free of said monomeric alcohol; secondly, fractionally distilling the distillate from said first fractional distillation in admixture with water whereby said ternary azeotrope is collected as distillate and substantially pure alcohol is obtained as residue; stratifying the distillate from the second distillation into two liquid phases or layers; returning the more aqueous layer to the second fractional distillation; and returning the other layer to the first fractional distillation.

2. A process for separating the azeotropic mixture obtained by distilling monomer of a beta,gamma-olefinic alcohol in admixture with monomer of a saturated monocarboxylic acid ester of the beta,gamma-olefinic alcohol, said monomeric alcohol containing not more than 6 carbon atoms and said monomeric ester containing not more than 12 carbon atoms, which comprises first fractionally distilling the azeotropic mixture in admixture with an aromatic hydrocarbon having a normal boiling point within 50° C. of the normal boiling point of said monomeric alcohol; collecting as residue from said first distillation monomeric ester substantially free of said monomeric alcohol; secondly, fractionally distilling the distillate from said first fractional distillation in admixture with water whereby the ternary azeotrope of said hydrocarbon, monomeric alcohol and water is collected as distillate and substantially pure alcohol is obtained as residue; stratifying the distillate from the second distillation into two liquid phases or layers; returning the more aqueous layer to the second fractional distillation; and returning the other layer to the first fractional distillation.

3. A process for separating the azeotropic mixture obtained by distilling allyl alcohol in admixture with allyl acetate which comprises first fractionally distilling the azeotropic mixture in admixture with an agent selected from the group consisting of an aromatic hydrocarbon which has a normal boiling point within 50° C. of the normal boiling point of monomeric allyl alcohol and which forms a binary azeotrope with allyl alcohol as well as a ternary azeotrope with allyl alcohol and water, which ternary azeotrope stratifies into two liquid phases at 20° C., hexane, heptane, cyclohexane, methylcyclohexane, trichloroethylene and allyl ether; collecting as residue from said first distillation allyl acetate substantially free of allyl alcohol; secondly, fractionally distilling the distillate from said first fractional distillation in admixture with water whereby said ternary azeotrope is collected as distillate and substantially pure alcohol is obtained as residue; stratifying the distillate from the second distillation into two liquid phases or layers; returning the more aqueous layer to the second fractional distillation; and returning the other layer to the first fractional distillation.

4. A process for separating the azeotropic mixture obtained by distilling allyl alcohol in admixture with allyl acetate which comprises first fractionally distilling the azeotropic mixture in admixture with an aromatic hydrocarbon having a normal boiling point within 50° C. of the normal boiling point of allyl alcohol; collecting as residue from said first distillation allyl acetate substantially free of allyl alcohol; secondly, fractionally distilling the distillate from said first fractional distillation in admixture with water whereby a ternary azeotrope of said hydrocarbon, allyl alcohol and water is collected as distillate and substantially pure allyl alcohol is obtained as residue; stratifying the distillate from the second distillation into two liquid phases or layers; returning the more aqueous layer to the second fractional distillation; and returning the other layer to the first fractional distillation.

5. A process for separating the azeotropic mixture obtained by distilling allyl alcohol in admixture with allyl formate which comprises first fractionally distilling the azeotropic mixture in admixture with an agent selected from the group consisting of an aromatic hydrocarbon which has a normal boiling point within 50° C. of the normal boiling point of monomeric allyl alcohol and which forms a binary azeotrope with allyl alcohol as well as a ternary azeotrope with allyl alcohol and water, which ternary azeotrope stratifies into two liquid phases at 20° C., hexane, heptane, cyclohexane, methylcyclohexane, trichloroethylene and allyl ether; collecting as residue from said first distillation allyl formate substantially free of allyl alcohol; secondly, fractionally distilling the distillate from said first fractional distillation in admixture with water whereby said ternary azeotrope is collected as distillate and substantially pure alcohol is obtained as residue; stratifying the distillate from the second distillation into two liquid phases or layers; returning the more aqueous layer to the second fractional distillation; and returning the other layer to the first fractional distillation.

6. A process for separating the components of the azeotropic mixture obtained by distilling allyl acetate in admixture with allyl alcohol which comprises first fractionally distilling the azeotropic mixture in admixture with benzene whereby the benzene-allyl alcohol azeotrope is collected as distillate and allyl acetate, substantially free of allyl alcohol, is obtained as residue; secondly, fractionally distilling the distillate from the first distillation in admixture with water whereby the benzene-allyl alcohol-water azeotrope is collected as distillate and substantially pure allyl alcohol is obtained as residue; stratifying the distillate from the second distillation into two liquid phases or layers; returning the more aqueous layer to the second fractional distillation; and returning the other layer to the first fractional distillation.

7. A process for separating the components of the azeotropic mixture obtained by distilling allyl formate in admixture with allyl alcohol which comprises first fractionally distilling the azeotropic mixture in admixture with benzene whereby the benzene-allyl alcohol azeotrope is collected as distillate and allyl formate, substantially free of allyl alcohol, is obtained as residue; secondly, fractionally distilling the distillate from the first distillation in admixture with water whereby the benzene-allyl alcohol-water azeotrope is collected as distillate and substantially pure allyl alcohol is obtained as residue; stratifying the distillate from the second distillation into two liquid phases or layers; returning the more aqueous layer to the second fractional distillation; and returning the other layer to the first fractional distillation.

DAVID E. ADELSON.
THEODORE W. EVANS.

REFERENCES CITED

The following references are of record in the file of this patent:

UNITED STATES PATENTS

| Number | Name | Date |
|---|---|---|
| 2,179,059 | Slagh | Nov. 7, 1939 |
| 2,192,489 | Rosebaugh | Mar. 5, 1940 |
| 2,406,561 | Rehberg | Aug. 27, 1946 |
| 2,485,694 | Burchfield | Oct. 25, 1949 |